(12) United States Patent
Zortman et al.

(10) Patent No.: US 9,780,870 B1
(45) Date of Patent: Oct. 3, 2017

(54) INTEGRATED UNALIGNED RESONANT MODULATOR TUNING

(71) Applicant: Sandia Corporation, Albuquerque, NM (US)

(72) Inventors: William A. Zortman, Corrales, NM (US); Anthony L. Lentine, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 55 days.

(21) Appl. No.: 14/502,062

(22) Filed: Sep. 30, 2014

(51) Int. Cl.
| | |
|---|---|
| *H04B 10/12* | (2006.01) |
| *H04B 10/04* | (2006.01) |
| *H04B 10/079* | (2013.01) |
| *H04B 10/516* | (2013.01) |
| *H04B 10/564* | (2013.01) |
| *H04B 10/524* | (2013.01) |
| *H04B 10/50* | (2013.01) |
| *H04B 10/572* | (2013.01) |

(52) U.S. Cl.
CPC ... *H04B 10/07955* (2013.01); *H04B 10/5057* (2013.01); *H04B 10/516* (2013.01); *H04B 10/524* (2013.01); *H04B 10/564* (2013.01); *H04B 10/572* (2013.01)

(58) Field of Classification Search
None
See application file for complete search history.

(56) References Cited

U.S. PATENT DOCUMENTS 4,730,301 A * 3/1988 McMahon ............. H04B 10/25
398/60
4,792,916 A * 12/1988 Benestad ............... H03H 17/02
375/247

(Continued)

OTHER PUBLICATIONS

Dave Van Ess, Integrate Your Signals Before Digitizing Them, 2012, http://electonicdesign.com/analog/integrate-your-signals-digitizing-them, pp. 1-4.*

(Continued)

*Primary Examiner* — Ken N Vanderpuye
*Assistant Examiner* — Jai Lee
(74) *Attorney, Agent, or Firm* — Martin I. Finston (57) ABSTRACT

Methods and systems for tuning a resonant modulator are disclosed. One method includes receiving a carrier signal modulated by the resonant modulator with a stream of data having an approximately equal number of high and low bits, determining an average power of the modulated carrier signal, comparing the average power to a predetermined threshold, and operating a tuning device coupled to the resonant modulator based on the comparison of the average power and the predetermined threshold. One system includes an input structure, a plurality of processing elements, and a digital control element. The input structure is configured to receive, from the resonant modulator, a modulated carrier signal. The plurality of processing elements are configured to determine an average power of the modulated carrier signal. The digital control element is configured to operate a tuning device coupled to the resonant modulator based on the average power of the modulated carrier signal.

14 Claims, 7 Drawing Sheets

(56) References Cited

U.S. PATENT DOCUMENTS

| | | | |
|---|---|---|---|
| 6,744,948 B1* | 6/2004 | Pi | G02B 6/2826 385/28 |
| 7,616,850 B1 | 11/2009 | Watts | |
| 7,977,622 B2* | 7/2011 | McLaren | G02B 6/12007 250/227.11 |
| 8,615,173 B1* | 12/2013 | Lentine | H04B 10/0799 398/182 |
| 9,083,460 B1* | 7/2015 | Zortman | H04B 10/50575 |
| 9,127,983 B1 | 9/2015 | Cox et al. | |
| 2003/0091116 A1 | 5/2003 | Yap et al. | |
| 2004/0174987 A1* | 9/2004 | Harrow | H04M 9/08 379/387.01 |
| 2005/0093724 A1* | 5/2005 | Berg | H03K 5/08 341/142 |
| 2005/0249509 A1 | 11/2005 | Nagarajan et al. | |
| 2006/0024065 A1* | 2/2006 | Von Lerber | H04B 10/299 398/155 |
| 2006/0034616 A1 | 2/2006 | Tipper | |
| 2006/0083144 A1 | 4/2006 | Piede et al. | |
| 2007/0110453 A1* | 5/2007 | Akiyama | G02B 6/12004 398/182 |
| 2007/0122148 A1 | 5/2007 | Welch et al. | |
| 2008/0240725 A1* | 10/2008 | Yokoyama | H04B 10/40 398/139 |
| 2011/0227615 A1* | 9/2011 | Faison | H03L 7/099 327/157 |
| 2013/0011139 A1* | 1/2013 | Hardy | G06F 19/321 398/79 |
| 2014/0110572 A1* | 4/2014 | Li | G01J 1/0209 250/227.23 |
| 2014/0169724 A1* | 6/2014 | Ingels | G02F 1/29 385/9 |
| 2014/0299751 A1 | 10/2014 | Tang | |
| 2015/0160482 A1* | 6/2015 | Amberg | G02F 1/0147 385/1 |
| 2015/0263190 A1 | 9/2015 | Knights et al. | |

OTHER PUBLICATIONS

Rhys Haden, Data Encoding Techniques, May 12, 2008, https://web.archive.org/web/20080512045442/http://www.rhyshaden.com/encoding.htm, pp. 1-7.*

Mishra, Raj G., HCTL Open International Journal: Technology Innovations and Research (IJTIR), Mar. 2013, HCTL Open Publishing, pp. 13-15.*

Smith, Steven W., The Scientist and Engineer's Guide to Digital Signal Processing, 1997, Technology & Engineering, pp. 277-283.*

Sackinger, Eduard, Broadband Circuits for Optical Fiber Communication, 2005, John Wiley & Sons, Inc. p. 29-30.*

Turner, Leaky Integrator, 2008, http://www.claysturner.com/dsp/Leaky%20Integrator.pdf.*

Cox et al., "Control of integrated micro-resonator wavelength via balanced homodyne locking", Optics Express, vol. 22, No. 9, May 5, 2014.

Derose et al., "Silicon Microring Modulator with Integrated Heater and Temperature Sensor for Thermal Control", IEEE, 2010.

Padmaraju et al., "Thermal Stabilization of a microring modulator using feedback control", Optics Express, vol. 20, No. 27, Dec. 17, 2012.

Padmaraju et al., "Wavelength Locking and Thermally Stabilizing Microring Resonators Using Dithering Signals", Journal of Lightwave Technology, vol. 32, No. 3, Feb. 1, 2014.

Timurdogan et al., "Automated Wavelength Recover for Microring Rsonators", CLEO Technical Digest, 2012.

U.S. Appl. No. 13/871,887, filed Apr. 26, 2013.

Zheng et al., A High-speed, tunable silicon photonic ring modulator integrated with ultra-efficient active wavelength control, Optics Express, vol. 22, No. 10, May 19, 2014.

Zortman et al., "Bit-Error-Rate Monitoring for Active Wavelength Control of Resonant Modulators", IEEE Computer Society, 2013.

Zortman et al., "Integrated CMOS Compatible Low Power 10 Gbps Silicon Photonic Heater-Modulator", OFC/NFOEC Technical Digest, 2012.

Amberg et al., "A sub-400 fJ/bit thermal tuner for optical resonant ring modulators in 40 nm CMOS", Nov. 2012, IEEE Asian Solid-State Circuits Conference.

* cited by examiner

INTEGRATED UNALIGNED RESONANT MODULATOR TUNING

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

CROSS-REFERENCE TO RELATED APPLICATIONS

The subject matter of this application is related to the subject matter of the co-pending and commonly owned U.S. patent application Ser. No. 14/462,416, which was filed on Aug. 18, 2014 by Anthony L. Lentine et al. under the title, "Power Meter Ratio Method of Stabilizing a Resonant Modulator".

FIELD OF THE INVENTION

The invention relates generally to resonant modulators, and more particularly, to methods for tuning resonant modulators.

BACKGROUND OF THE INVENTION

In typical signal transmission applications, a carrier signal is modulated with a stream of data consisting of the information to be transmitted. When the transmission employs optical carrier signals (such as a beam of light), an optical modulator is used. One class of optical modulators, referred to herein as resonant modulators, operates by modulating an optical signal while that signal resonates within a body of the modulator. Such resonant modulators, however, may experience changes in temperature over the course of their operation that diminish the effectiveness of the modulator (e.g., by changing the resonant frequency and/or switching voltage of the modulator). Accordingly, improvements are desired for maintaining the effectiveness of resonant modulators.

SUMMARY OF THE INVENTION

Aspects of the present invention are directed to methods and systems for tuning a resonant modulator.

In accordance with one aspect of the present invention, a method for tuning a resonant modulator is disclosed. The method includes receiving a carrier signal modulated by the resonant modulator with a stream of data having an approximately equal number of high and low bits, determining an average power of the modulated carrier signal over a predetermined number of bits, comparing the average power to a predetermined threshold, and operating a tuning device coupled to the resonant modulator based on the comparison of the average power and the predetermined threshold over the predetermined number of bits.

In accordance with another aspect of the present invention, a method for tuning a resonant modulator is disclosed. The method includes determining an average power of a stream of data over a predetermined number of bits, receiving a carrier signal modulated by the resonant modulator with the stream of data, determining an average power of the modulated carrier signal over the predetermined number of bits, comparing the average power of the stream of data to the average power of the modulated carrier signal, and operating a tuning device coupled to the resonant modulator based on the comparison of the average power of the stream of data and the average power of the modulated carrier signal.

In accordance with yet another aspect of the present invention, a system for tuning a resonant modulator is disclosed. The system includes an input structure, a plurality of processing elements, and a digital control element. The input structure is configured to receive, from the resonant modulator, a carrier signal modulated with a stream of data. The plurality of processing elements are configured to determine an average power of the modulated carrier signal over a predetermined number of bits of the stream of data. The digital control element is configured to operate a tuning device coupled to the resonant modulator based on the average power of the modulated carrier signal over the predetermined number of bits.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The exemplary systems and methods described herein are usable to tune (or control) resonant modulators in optical transmission systems. In general, the disclosed embodiments compare data and/or power from a signal to be transmitted with a baseline or the original data stored in memory. As will be described below, the baseline may be generated based on known features of the data (such as a known number of high or low bits).

Figure 1:
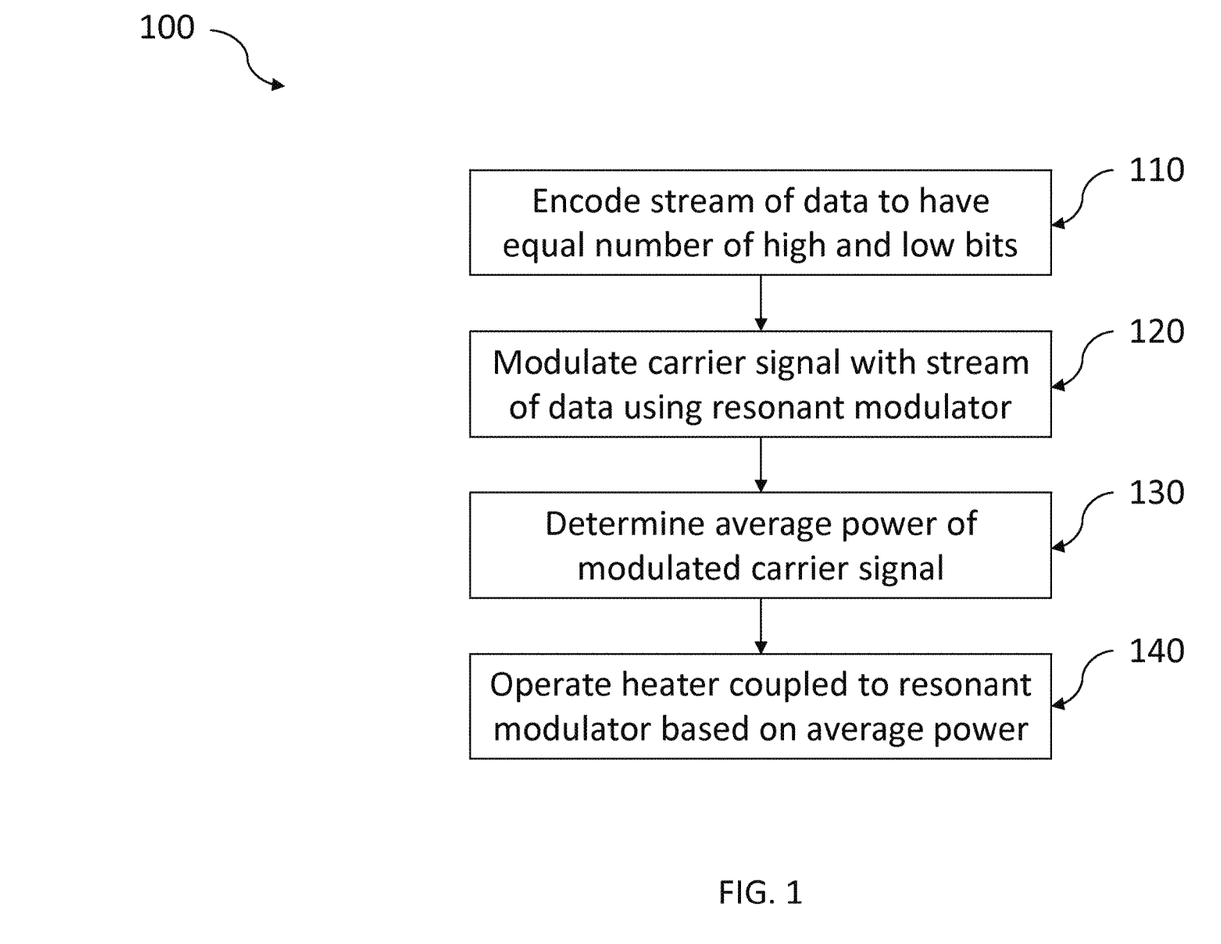
FIG. 1 is a flowchart illustrating an exemplary method for tuning a resonant modulator in accordance with aspects of the present invention.

Referring now to the drawings, FIG. 1 illustrates an exemplary method 100 for tuning a resonant modulator in accordance with aspects of the present invention. Method 100 is usable for controlling resonant modulators such as ring or disc modulators. As a general overview, method 100 includes encoding data, modulating a signal, determining average power, and operating a tuning device. Additional details of method 100 are described below.

In step 110, a stream of data is encoded. The stream of data is encoded to have an approximately equal number of high and low bits. In other words, the stream of data is encoded to achieve DC-balance. The data may be encoded prior to being stored in memory, or may be encoded as part of the process of transmitting the data by the transmission system. Suitable processes for encoding data to achieve DC-balance include 8b/10b encoding, and will be known to one of ordinary skill in the art from the description herein.

In step 120, a carrier signal is modulated with the encoded stream of data. The carrier signal may be any suitable optical carrier signal. The carrier signal is modulated using the resonant modulator to be tuned by method 100. The resonant modulator modulates the carrier signal by varying a property (e.g. amplitude) of the carrier signal based on whether each bit in the stream of data is high or low. As set forth above, in an exemplary embodiment, the resonant modulator may be a ring modulator or a disc modulator. Other suitable modulators for use with method 100 will be known to one of ordinary skill from the description herein.

In step 130, an average power of the modulated carrier signal is determined over a plurality of bits of the data. The term "average power" used herein is not intended to limit the determination to a true mean of the power of the carrier signal. To the contrary, as used herein, the determination of "average power" is intended to encompass a range of values that are derived from or representative of the power of the modulated carrier signal over a period of time (or data bits). Examples of such determinations are provided below for the purpose of illustration.

In one exemplary embodiment, the portion of interest of the modulated carrier signal is extracted from the signal to be transmitted by the transmission system. The portion of interest may comprise a predetermined number of bits of the modulated carrier signal. The extracted portion of the modulated carrier signal is then provided as input to an integrator circuit. The extracted modulated carrier signal is integrated to create a running value of power for the signal. As part of this integration, each high data bit in the extracted modulated carrier signal increases the running power value, while low data bits do not affect the running power value.

As set forth above, the original stream of data used to modulate the carrier signal is encoded to achieve DC-balance. Under this encoding, it is expected that approximately 50% of the bits in the modulated data will be high data bits. Assuming perfect operation of the resonant modulator, the running power value of the modulated carrier signal can be predicted based on this expected number of high bits in the modulated data. Accordingly, an expected power value can be predetermined based on the assumption that half the number of data bits in the extracted modulated carrier signal are high bits. The expected power value can be stored in memory and periodically accessed as set forth below.

When the running power value differs from this predetermined expected value, it may be determined to be caused by improper operation of the resonant modulator. This improper operation is monitored by periodically sampling the running power value to determine whether the value is greater than or less than or equal to the predetermined expected power value (or threshold) for the extracted portion of the modulated carrier signal. In this embodiment, the sampling is done by a counter that periodically increments or decrements a count based on a comparison of the running power value to the expected power value. The counter may sample the running power value at a frequency much lower than the data frequency of the signal. In an exemplary embodiment, the counter samples the running power value once for every N data bits in the extracted modulated carrier signal, where N is a number from 10 to 500. When the running power value is greater than the predetermined threshold value, the count is incremented; when the running power value is not greater than the predetermined threshold value, the count is decremented. In this embodiment, both the running power value and the count maintained by the counter can be considered to be representative of the average power of the modulated carrier signal over the extracted number of bits.

In another exemplary embodiment, the data bits in the extracted modulated carrier signal are counted. In particular, the number of high data bits in the extracted modulated carrier signal is counted using a counter circuit. In this embodiment, low data bits do not affect the running count. An expected number of high bits (i.e. an expected count value) can be predetermined assuming that half the number of data bits in the extracted modulated carrier signal are high bits, as set forth above in the previous example.

When the running count value differs from this predetermined expected count, it may be determined to be caused by improper operation of the resonant modulator. This improper operation is monitored by periodically sampling the running count value to determine whether the value is greater than or less than or equal to the predetermined expected count for the extracted portion of the modulated carrier signal. In this embodiment, the sampling is done by another counter that periodically increments or decrements a count based on the result of the comparison. The counter may sample the running count at a frequency much lower than the data frequency of the signal, as set forth above in the previous example. When the running count is greater than the predetermined expected count value, this second count is incremented; when the running power value is not greater than the predetermined expected count value, the second count is decremented. In this embodiment, both the running count value and the second count value can be considered to be representative of the average power of the modulated carrier signal over the extracted number of bits.

It will be understood that the exemplary processes for determining an average power set forth above are provided for the purposes of illustration. Other methods for determining an average power in a modulated signal will be known to one of ordinary skill in the art from the description herein.

Prior to processing an optical carrier signal with one or more electrical components, as described above, the optical signal is converted to an electrical signal. Accordingly, step 130 may further include the sub-step of converting the modulated optical carrier signal into an electrical signal. Suitable structures for converting an optical signal to an electrical signal include photodiodes or phototransistors. Other suitable structures will be known to one of ordinary skill in the art from the description herein.

In step 140, a tuning device is operated based on the average power. In an exemplary embodiment, the tuning device is a resistive heater configured to adjust (i.e. raise) a temperature of the resonant modulator. The heater is coupled to the resonant modulator in order to maintain a desired operating temperature of the resonant modulator during operation. When the system includes a plurality of modulators, it is desirable that each modulator be associated with its own distinct heater. Additionally, the plurality of modulators may be coupled to a cooling device (such as a thermo-electric cooler) for counteracting the effects of the individual heaters.

The heater is operated based on the average power determined for the modulated carrier signal over the plurality of bits. As set forth above, the average of the modulator signal is compared to a predetermined threshold or baseline based on known information about the stream of data used to modulate the carrier signal (e.g., based on a known number of high bits). The threshold is selected such that when the average power exceeds the predetermined threshold, it may be determined that the modulator is not working properly (e.g., the modulator is not fully modulating the carrier signal).

In accordance with aspects of the present invention, improper function of the modulator (as determined by processing of the average power of the modulated carrier signal) may be presumed to be caused (at least in part) by temperature drift of the modulator. Temperature drift of the modulator can change a resonant frequency thereof, which may inhibit the optical carrier signal from resonating in the modulator and thereby being modulated by the resonant modulator. Additionally, the switching voltage of the modulator may be affected by changes in temperature of the modulator, which may prevent the modulator from properly modulating the optical carrier signal. Accordingly, when the average power is greater than the predetermined threshold, it may be determined that the modulator temperature has drifted downward, and the heater is turned on to correct the temperature drift. Conversely, when the average power is not greater than the predetermined threshold, it may be determined that the modulator temperature has drifted upward, and the heater is turned off to allow the modulator temperature to return to a desired level.

The value assigned to the predetermined threshold depends, e.g., on which of the above-described methods (or what other method) is used to determine the average power. If the average power is determined according to a running power value as described above, the value assigned to the predetermined threshold is the expected power value for the number of data bits in the extracted modulated carrier signal. If the average power is determined by counting a number of "high" bits as described above, the value assigned to the predetermined threshold is the expected number of high bits for the number of data bits in the extracted modulated carrier signal. The determination of other thresholds will be apparent to one of ordinary skill in the art from the description herein and in view of the desired process for determining an average power in the signal.

The determination of average power and the operation of the heater described above in steps 130 and 140 are preferably performed continuously during operation of the transmission system. During operation of the resonant modulator, the heater can be periodically operated when errors in modulator operation are detected through monitoring of the average power of the modulated carrier signal.

Although a resistive heater is a commonly used tuning device for resonant optical modulators, other tuning devices are also known and may be implemented as an alternative to, or even in addition to, a resistive heater in the practice of the present invention. Such alternative devices include, for example, p-i-n junction-based carrier-injection and carrier-depletion devices. Such devices, which typically are respectively operated in forward and reverse bias, are examples of tuning devices that may be used for bias tuning of the resonant optical modulator. In fact, for some applications it may be sufficient to tune the resonant modulator simply by controlling the bias point of the modulation PN junction. Of course that technique may also be used in conjunction with any other known tuning methods. In one example of bias tuning, proposed, strictly for pedagogical purposes, a modulator is normally operated at a bias of −0.5V and +0.5V for the 0 and 1 logic states, respectively. To operate at a retuned resonance, the respective bias voltages might be shifted to, e.g., 0V and 0.7V. This will shift both the low and high states, so that the device can be operated at a new temperature. The range between the effective low and high bias voltages is not a linear function in general, and so will typically be adapted according to the specific amount of retuning that is needed.

Figure 2:
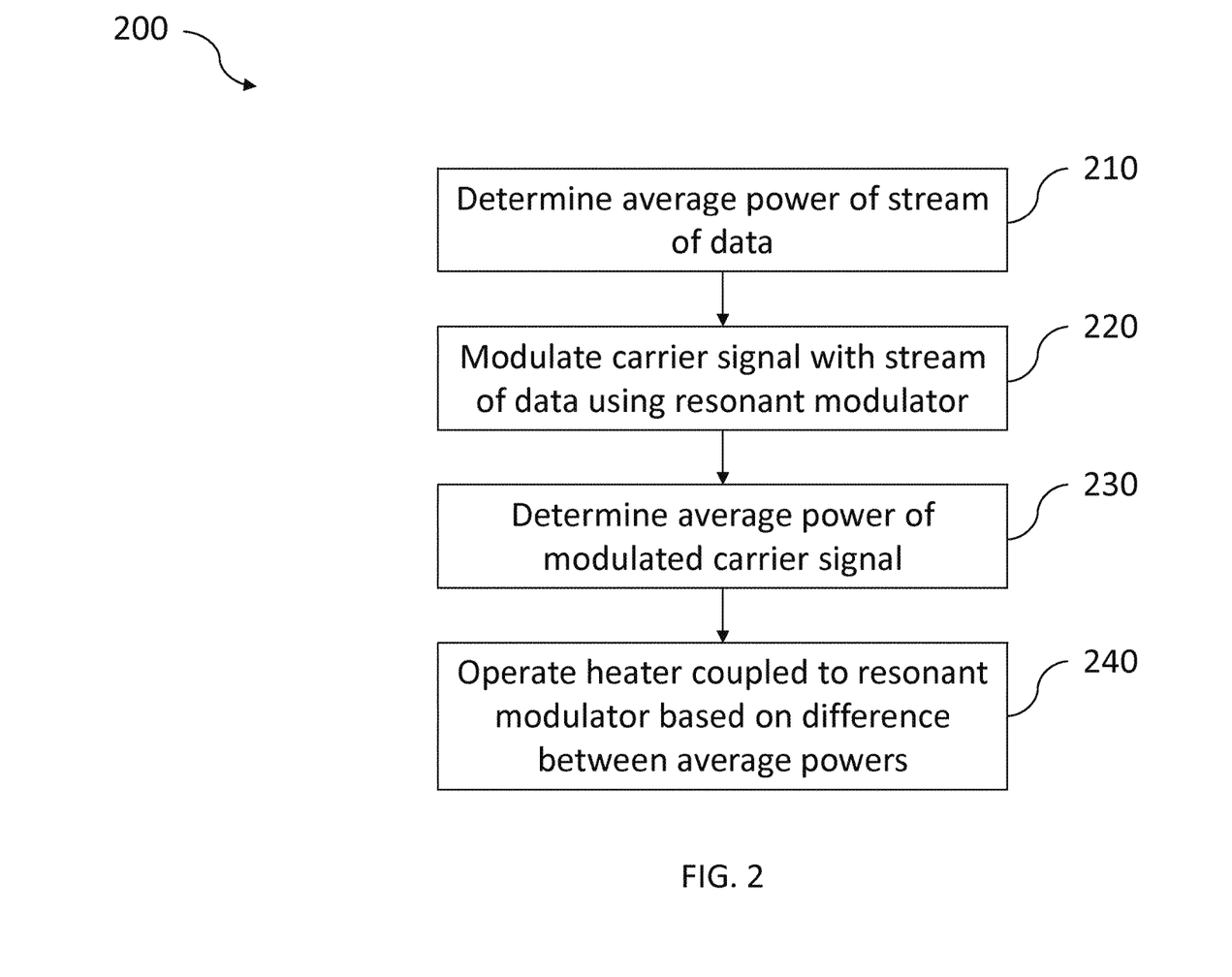
FIG. 2 is a flowchart illustrating another exemplary method for tuning a resonant modulator in accordance with aspects of the present invention.

FIG. 2 illustrates another exemplary method 200 for tuning a resonant modulator in accordance with aspects of the present invention. Like method 100, method 200 is usable for controlling resonant modulators such as ring or disc modulators. As a general overview, method 200 includes determining an average power of a stream of data, modulating a signal, determining average power of the modulated signal, and operating a tuning device. One advantage of method 200 is that the modulation is no longer constrained to equal numbers of high and low bits, or in other words, an encoding step as described above is unnecessary. Additional details of method 200 are described below.

In step 210, an average power of a stream of data is determined over a plurality of bits. The stream of data can be data stored in a memory of the transmission system. As set forth above, the determination of "average power" is intended to encompass a range of values that are derived from or representative of the power of the modulated carrier signal over a period of time (or data bits). The determination of the average power of the stream of data may be done according to any of the examples set forth above with respect to step 130 in method 100. For one example, the stream of data can be integrated with an integrator to obtain a running power value. For another example, the number of high bits in the steam of data can be counted with a counter to obtain a running count value.

In step 220, a carrier signal is modulated with the stream of data. The carrier signal is modulated using the resonant modulator to be tuned by method 200, substantially as described above with respect to step 120 in method 100.

In step 230, an average power of the modulated carrier signal is determined over a predetermined number of bits of the data. The modulated carrier signal may further be required to be extracted from the transmission line before the determination of average power is made. The determination of average power in this step should correspond to the process used for determining average power in step 210. In other words, the same process is used to determine the average power of the original stream of data (in step 210) and the carrier signal modulated with the original stream of data (in step 230). Likewise, the average power determination is made for the same set of data bits.

In step 240, a tuning device is operated based on the average powers. In an exemplary embodiment, a resistive heater is operated based on the comparison of the average relative power of the original stream of data and the average power of the modulated carrier signal. In an exemplary embodiment, the average power of the modulated carrier signal (e.g., the running power value or the running count value) is compared to the average power of the original stream of data with a comparator.

Since the original stream of data is electrical and the modulated signal is optical, an appropriate constant for comparing the two powers can be determined. Normalization is needed to facilitate comparison between an original data stream in the electrical domain and a modulated optical signal. An appropriate normalization factor is readily provided by known methods.

If, however, a count signal (the number of high signals in a given number of bits) is used as a measure of power, then the count signals can be compared directly. In the event that any difference appears between the average power of the original stream of data and the average power of the modulated data, it may be inferred that the modulator is not working properly (e.g., the modulator is not fully modulating the carrier signal). This improper operation is monitored by periodically sampling the comparator output to determine whether there is a difference between the average powers. In this embodiment, the sampling is done by a counter that increments or decrements a count based on the comparator output. When the average power of the modulated carrier signal is greater than the average power of the original stream of data, this count is incremented; when the average power of the modulated carrier signal is not greater than the average power of the original stream of data, the count is decremented. This count forms a representation of the difference between the average powers, and can be used to control operation of the heater in this step.

As in method 100, improper function of the modulator may be presumed to be caused (at least in part) by temperature drift of the modulator. Accordingly, when the average power of the modulated carrier signal is greater than the average power of the original stream of data, it may be determined that the modulator temperature has drifted downward, and the heater is turned on to correct the temperature drift. Conversely, when the average power of the modulated carrier signal is not greater than the average power of the original stream of data, it may be determined that the modulator temperature has drifted upward, and the heater is turned off to allow the modulator temperature to return to a desired level. This operation may be referred to as "side-locking"; that is, the average power level is on the side of the "average" resonance. There may be a finite range over which the above-described operation is appropriate. For example, if a large, fast variation moves the operating point to the other side of the resonance, then the control circuit may be reset so that the above directionality can be applicable.

Figure 7A:
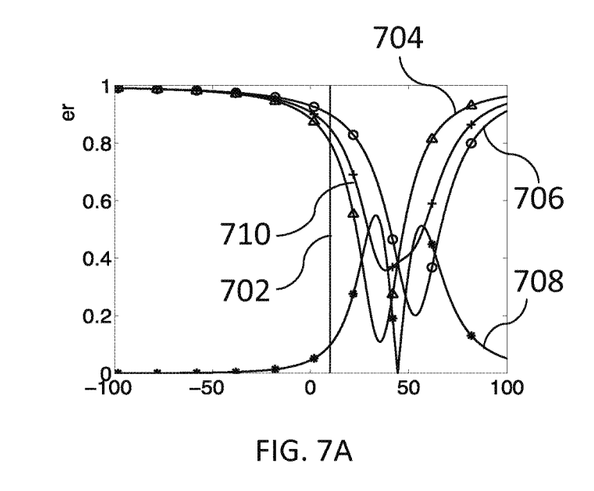
FIGS. 7A-7D are graphs illustrating the effect that changes in temperature have on signal transmission for an exemplary resonant modulator in accordance with aspects of the present invention.
Figure 7B:
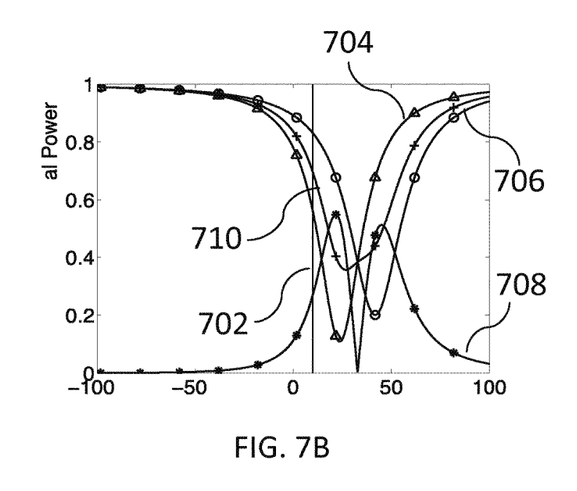
Figure 7C:
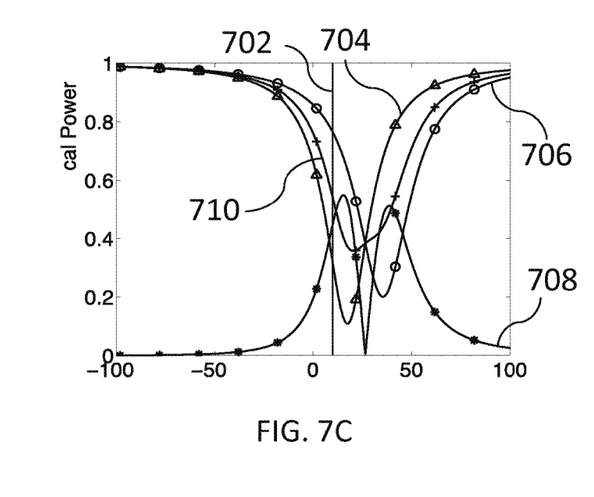
Figure 7D:
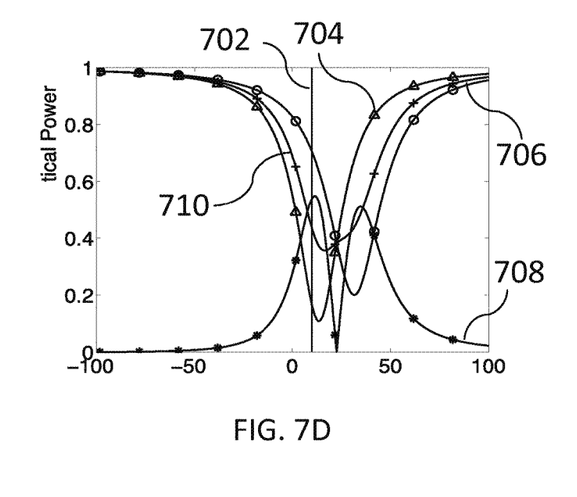

More specifically, FIGS. 7A-7D (which are discussed in greater detail below) show resonance curves in which the normalized average output power 710 is plotted versus frequency offset of the resonance. FIGS. 7A to 7D show increasing temperatures, with FIG. 7D showing a temperature near optimum. Optimum operation is obtained by maximizing the differential transmission, i.e. the difference between a logic one (704) and logic zero (706), as represented in the figure by curve 708. This occurs when the laser line (702) is shown to intersect the average output power on the left side of the resonance at a specific value corresponding to the intersection of those lines in FIG. 7D.

The effect of cooling (moving from 7D to 7A) is to shift the center frequency of the resonance to the right, which increases the separation between the operating point and the center frequency, consequently reducing the modulation depth. Heating beyond the optimum (not shown, but easily envisioned by shifting the curves far to the left), will also decrease the modulation depth, eventually passing through zero before inverting the modulation. If the system enters that state, it should be reset to allow normal operation of the control loop to continue.

The above-described embodiment is provided as an example of step 240, and it not intended to be limiting. For another example, the heater may be operated opposite from the above example. In this example, when the average power of the modulated carrier signal is greater than the average power of the original stream of data, the heater can be turned off to allow the modulator temperature to return to a desired level. Conversely, when the average power of the modulated carrier signal is not greater than the average power of the original stream of data, the heater can be turned on to correct the temperature drift. The configuration of a system in either alternative embodiment will be apparent to one of ordinary skill in the art from the description herein.

The determination of average power and the operation of the heater described above in steps 210, 230, and 240 are preferably performed continuously during operation of the transmission system. During operation of the resonant modulator, the heater can be periodically operated when errors in modulator operation are detected through monitoring of the average power of the modulated carrier signal.

Figure 3:
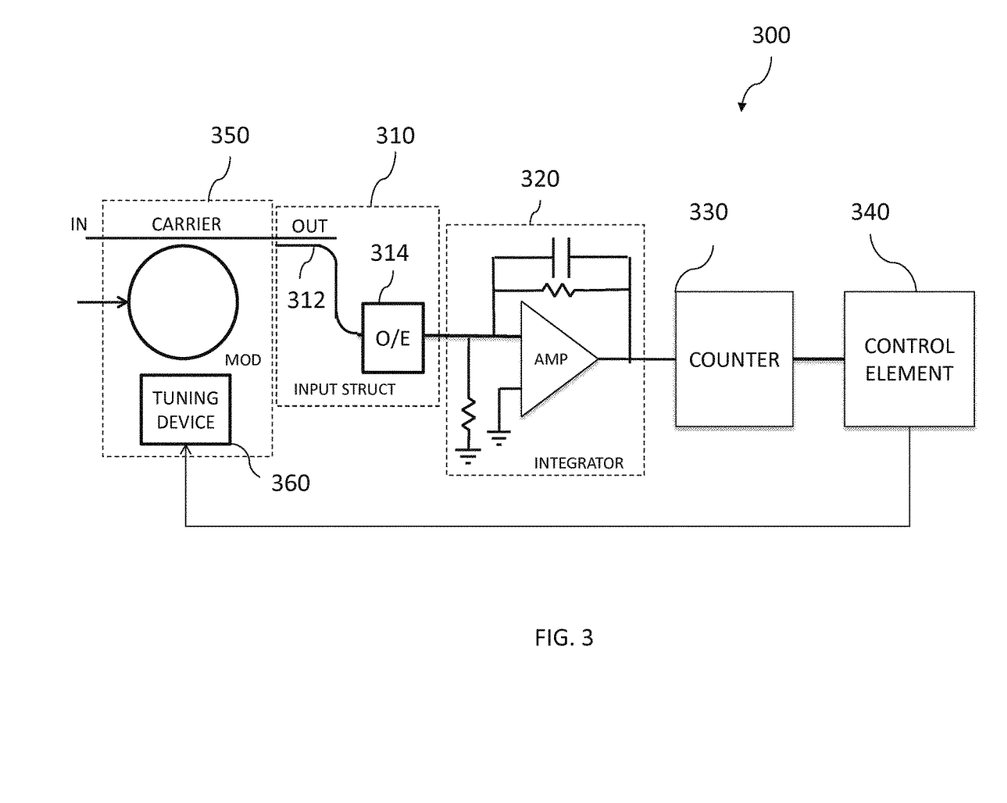
FIG. 3 is a block diagram illustrating an exemplary system for tuning a resonant modulator in accordance with aspects of the present invention.

FIG. 3 illustrates an exemplary system 300 for tuning a resonant modulator in accordance with aspects of the present invention. System 300 is usable for controlling resonant modulators according to the processes described above in method 100. As a general overview, system 300 includes an input structure 310, an integrator 320, a counter 330, and a control element 340. Additional details of system 300 are described below.

Input structure 310 is configured to receive a signal from the resonant modulator. In particular, input structure 310 receives a carrier signal that has been modulated with a stream of data by a modulator 350. Input structure 310 may extract the signal from a waveguide between modulator 350 and a transmitter (not shown). In this setup, input structure 310 may be positioned directly adjacent the transmitter, in order to obtain a signal closely matching the signal actually transmitted.

Preferably, input structure 310 splits a small amount of power (e.g., 2%-10%) from the main signal to be transmitted and converts it into an electrical signal. In an exemplary embodiment, input structure 310 comprises an evanescent coupling structure. In particular, the evanescent coupling structure may include a waveguide 312 evanescently coupled to the output waveguide of the resonant modulator, and additionally coupled to an optical to electrical (O/E) converter 314 such as a suitably biased photodiode or phototransistor that converts the optical signal split from the output waveguide into an electrical signal. Other suitable evanescent coupling structures for use as input structure 310 will be known to one of ordinary skill in the art from the description herein.

Integrator 320 receives the signal obtained by input structure 310. Integrator 320 is configured to determine an average power of the modulated carrier signal over a plurality of bits obtained by input structure 310. In an exemplary embodiment, integrator 320 integrates the modulated carrier signal to obtain a running power value as described above with respect to step 130.

In a preferred embodiment, integrator 320 comprises an operational amplifier (op-amp) configured as a low-pass filter (e.g a leaky integrator), as shown in FIG. 3. The configuration of an op-amp as an integrator will be known to one of ordinary skill in the art. Other suitable processing elements for use as integrator 320 will be known to one of ordinary skill in the art from the description herein.

Counter 330 receives the output from integrator 320. Counter 330 increments or decrements a count based on the output of integrator 320. In an exemplary embodiment, counter 330 periodically samples the running power value output by integrator 320, as described above with respect to step 130. The counter increments its count when the running power value is greater than a predetermined threshold, and decrements its count when the running power value is not greater than the predetermined threshold. Suitable processing elements for use as counter 330 will be known to one of ordinary skill in the art from the description herein.

The predetermined threshold utilized by integrator 320 is a voltage threshold that depends on the operating voltage of integrator 320. In one embodiment, integrator 320 is designed such that the predetermined threshold corresponds to the turn-on voltage of the input transistor(s) (not shown) of integrator 320. Counter 330 is configured to determine whether the running power value determined by integrator 320 is greater than or less than or equal to the predetermined voltage threshold.

The rate of periodic sampling of counter 330 is determined by a clock signal provided to counter 330. Counter 330 may be clocked at a frequency much lower than the data frequency of the signal. In an exemplary embodiment, the data frequency of the signal is 10 GHz, and the clock frequency for counter 330 is 10 MHz.

Control element 340 is configured to operate a tuning device. As shown in FIG. 3, heater 360 is coupled to modulator 350 and is operable to increase the temperature of modulator 350. Control element 340 operates heater 360 based on the average power of the modulated carrier signal determined by integrator 320 and counter 330. In particular, control element 340 can be connected to receive the output (i.e., the count) provided by counter 330.

Control element 340 operates heater 360 based on the count value maintained by counter 330. A higher count value from counter 330 indicates that heater 360 should be turned on to raise the temperature of modulator 350; a lower count value from counter 330 indicates that heater 360 should be turned off to allow the temperature of modulator 350 to drop.

In an exemplary embodiment, control element 340 is a digital to analog converter (DAC). The DAC accepts the digital count from counter 330 as input, and converts that signal to an analog voltage for controlling heater 360. In an alternative exemplary embodiment, control element 340 is a digital pulse width modulator (PWM). The PWM accepts the digital count from counter 330 as input, and uses that signal to control the average voltage (or pulse-width) of a signal for operating heater 360. Other possible forms for control element 340 will be apparent to one of ordinary skill in the art from the description herein. The heater 360 may be, for example, a resistive heater. Other tuning devices for use in place of or in addition to heater 360 will be known to those of ordinary skill in the art from the description herein.

Figure 4:
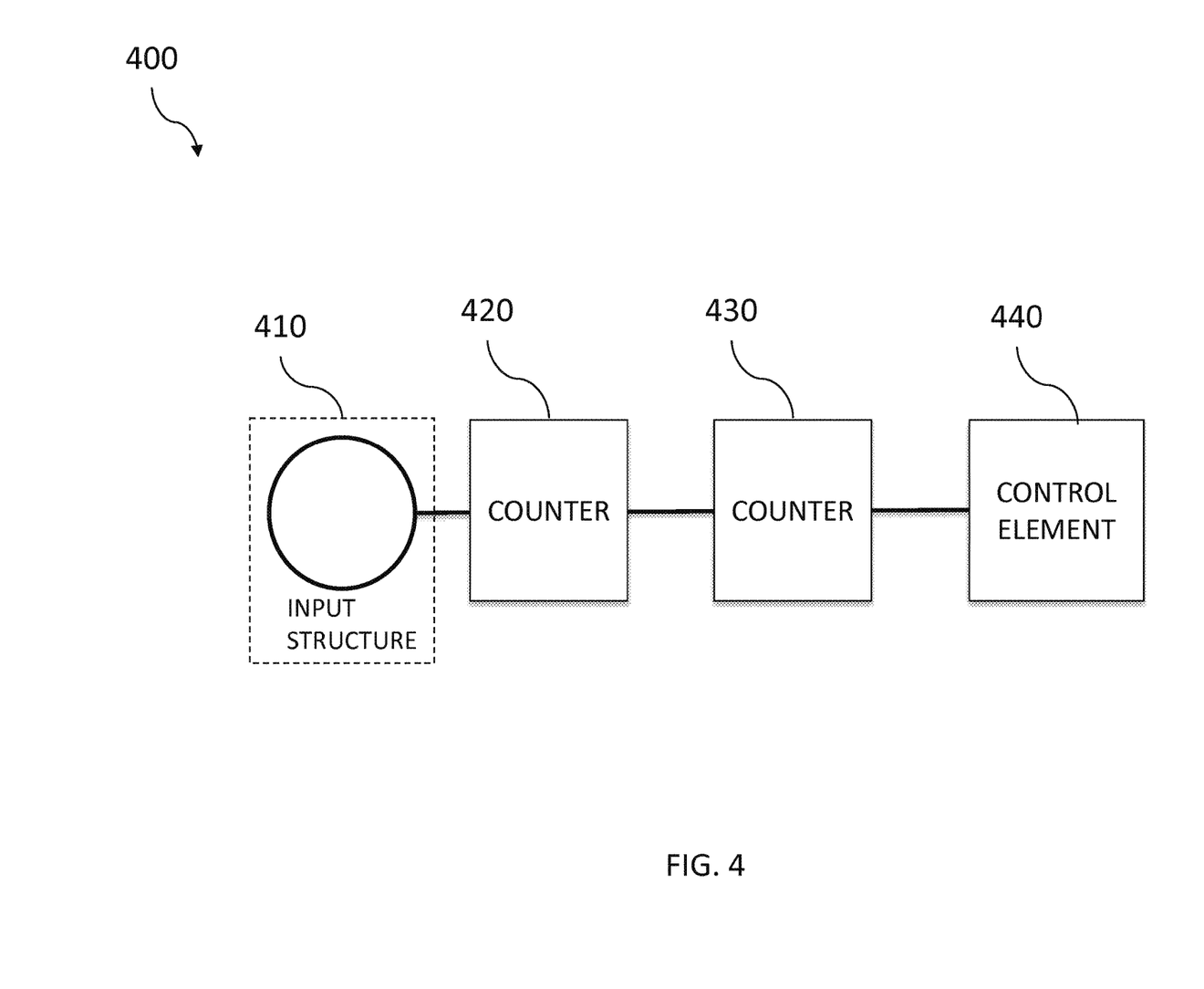
FIG. 4 is a block diagram illustrating another exemplary system for tuning a resonant modulator in accordance with aspects of the present invention.

FIG. 4 illustrates another exemplary system 400 for tuning a resonant modulator in accordance with aspects of the present invention. Like system 300, system 400 is also usable for controlling resonant modulators according to the processes described above in method 100. As a general overview, system 400 includes an input structure 410, a first counter 420, a second counter 430, and a control element 440. The components of system 400 are substantially the same as the corresponding components of system 300, except as described below.

Counter 420 receives the signal obtained by input structure 410. Input structure 410 may have substantially the same form as input structure 310 illustrated in FIG. 3. Counter 420 is configured to determine an average power of the modulated carrier signal over a plurality of bits obtained by input structure 410. In an exemplary embodiment, counter 420 counts a number of high bits of the data in the modulated carrier signal to obtain a running count value as described above with respect to step 130. Suitable processing elements for use as counter 420 will be known to one of ordinary skill in the art from the description herein. After counter 420 has completed counting the number of high bits in the extracted modulated carrier signal, it may be necessary to reset the count maintained by counter 420 before repeating the process.

Counter 430 receives the output from counter 420. Counter 430 increments or decrements a count based on the output of counter 420. In an exemplary embodiment, counter 430 periodically samples the running count value output by counter 420, as described above with respect to step 130. The counter increments its count when the running count value is greater than a predetermined threshold, and decrements its count when the running count value is not greater than the predetermined threshold. Suitable processing elements for use as counter 430 will be known to one of ordinary skill in the art from the description herein, and in a preferred embodiment, counter 430 may include the same element(s) as counter 420.

Figure 5:
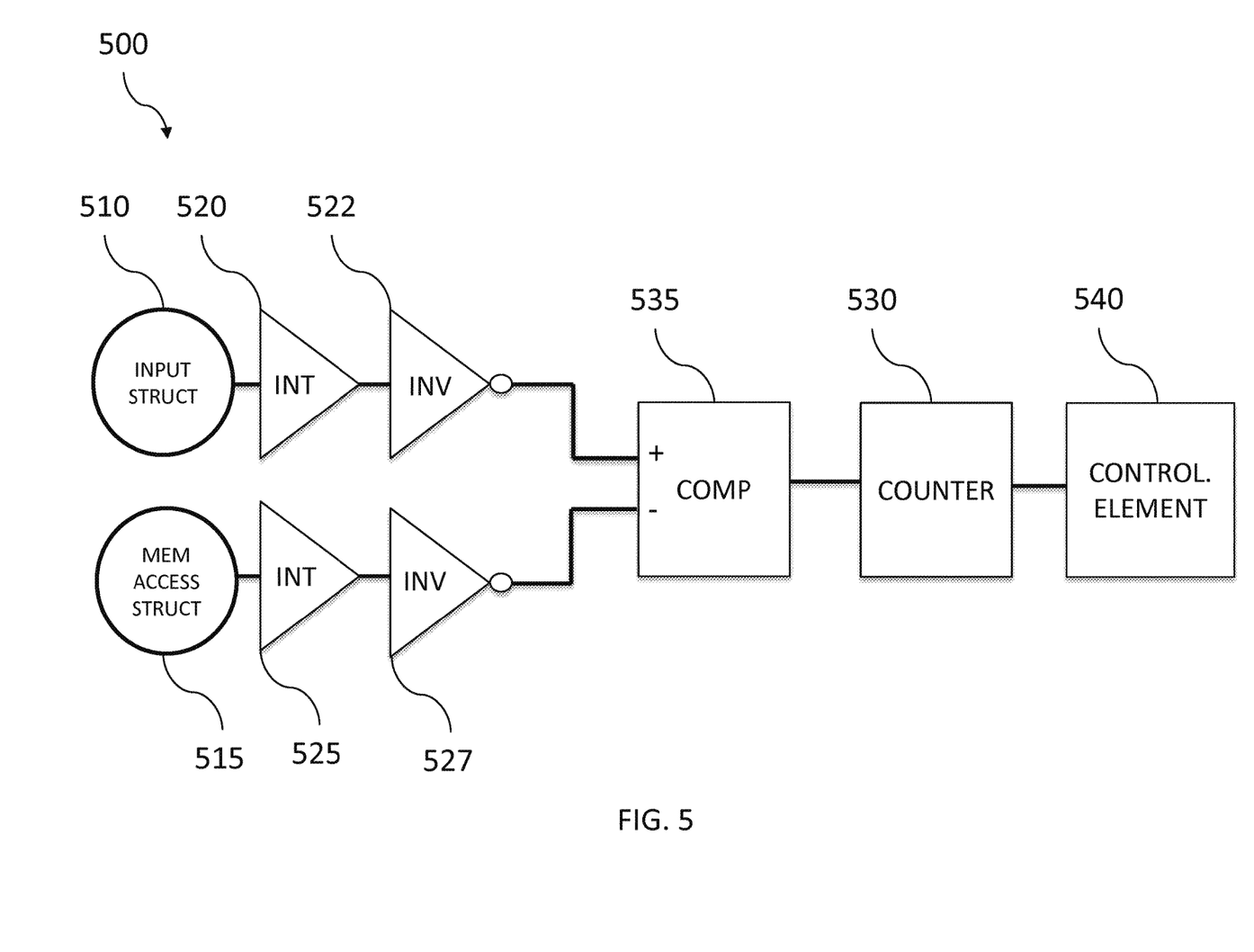
FIG. 5 is a block diagram illustrating yet another exemplary system for tuning a resonant modulator in accordance with aspects of the present invention.

FIG. 5 illustrates another exemplary system 500 for tuning a resonant modulator in accordance with aspects of the present invention. System 500 is usable for controlling resonant modulators according to the processes described above in method 200. As a general overview, system 500 includes an input structure 510, a memory access structure 515, integrators 520 and 525, a counter 530, a comparator 535, and a control element 540. The components of system 500 are substantially the same as the corresponding components of system 300, except as described below.

Input structure 510 is configured to receive a modulated carrier signal from the resonant modulator, as set forth above with respect to input structure 310. Memory access structure 515 is configured to obtain the stream of data used to modulate the carrier signal from a memory of the transmission system. Alternatively, instead of obtaining the stream of data used to modulate the carrier signal from memory, system 500 may include a tap that directly accesses the stream of data as the modulator is performing the modulation according to the stream of data. Accordingly, system 500 operates using both the original stream of data and the carrier signal modulated with the original stream of data. Suitable structures for accessing data stored in memory will be well known to one of ordinary skill in the art from the description herein. Accessing the stream of data from memory may be desirable in order to avoid issues with delaying the original stream of data relative to the modulated signal. In embodiments in which the control line to the modulated is directly tapped to obtain the stream of data, it may be necessary to delay the processing of the original stream of data in order for such processing to be substantially contemporaneous with the processing of the modulated carrier signal.

Integrators 520 and 525 receive the signals obtained by input structure 510 and memory access structure 515, respectively, as shown in FIG. 5. Integrators 520 and 525 integrate the extracted modulated carrier signal and the original stream of data, respectively, to obtain running power values as described above with respect to steps 210 and 230. Integrators 520 and 525 may operate continuously on the data as it is obtained, or may operate intermittently by sampling the data obtained by input structure 510 and memory access structure 515. As shown in FIG. 5, system 500 may further include inverters 522 and 527 positioned to invert the output of each integrator 520 and 525, respectively. Inverting the output of integrators 520 and 525 may be desirable to ensure proper processing of the integrator outputs by comparator 535. Depending on the structure of comparator 535, one or both of inverters 522 and 527 may be omitted.

Comparator 535 receives the outputs from integrators 520 and 525. Comparator 535 compares the running power value of the modulated carrier signal to the running power value of the original stream of data, as described above with respect to step 240. Comparator 535 provides an output based on the result of the comparison. The output may indicate that the running power values are equal, or may indicate which running power value is higher or lower than the other.

Counter 530 receives the output from comparator 535. Counter 530 increments or decrements a count based on the output of comparator 535. In an exemplary embodiment, counter 530 periodically samples the output of comparator 535, as described above with respect to step 240. The counter increments its count when the average power of the modulated carrier signal is greater than the average power of the original stream of data, and decrements its count when the average power of the modulated carrier signal is not greater than the average power of the original stream of data.

Figure 6:
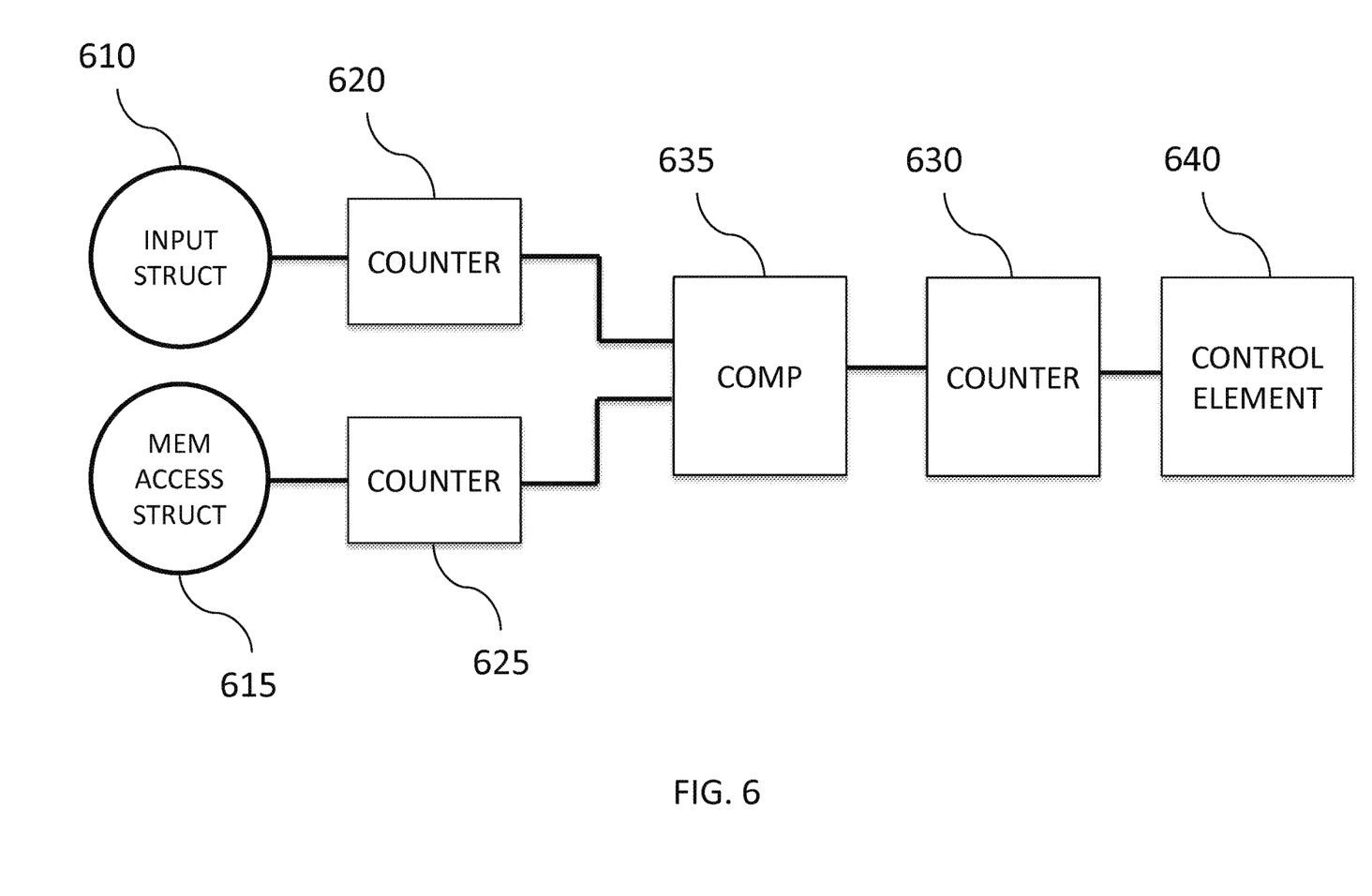
FIG. 6 is a block diagram illustrating yet another exemplary system for tuning a resonant modulator in accordance with aspects of the present invention.

FIG. 6 illustrates another exemplary system 600 for tuning a resonant modulator in accordance with aspects of the present invention. Like system 500, system 600 is also usable for controlling resonant modulators according to the processes described above in method 200. As a general overview, system 500 includes an input structure 610, a memory access structure 615, counters 620 and 625, another counter 630, a comparator 635, and a control element 640. The components of system 600 are substantially the same as the corresponding components of system 500, except as described below.

Counters 620 and 625 receive the signals obtained by input structure 610 and memory access structure 615, respectively, as shown in FIG. 6. Counters 620 and 625 count a number of high bits in the extracted modulated carrier signal and in the original stream of data, respectively, to obtain running count values as described above with respect to steps 210 and 230. Counters 620 and 625 may continuously count high bits in the data as it is obtained, or may operate intermittently by sampling the data obtained by input structure 610 and memory access structure 615.

Comparator 635 receives the outputs from counters 620 and 625. Comparator 635 compares the running count value of the modulated carrier signal to the running count value of the original stream of data, as described above with respect to step 240. Comparator 635 provides an output based on the result of the comparison. The output may indicate that the running count values are equal, or may indicate which running power value is higher or lower than the other.

FIGS. 7A-7D are graphs illustrating the effect that changes in temperature have on signal transmission for an exemplary resonant modulator in accordance with aspects of the present invention. As shown in the drawings, line 702 represents the frequency of an exemplary carrier signal (such as a laser) to be modulated by an exemplary resonant modulator. Curves 704 and 706 show the transmission factors of the exemplary resonant modulator for different ranges of frequencies (relative to the frequency of the exemplary carrier signal 702) for two different values of applied voltage to the modulator that represent the values of logic 1 and logic 0 where they cross line 702. Curve 708 shows the differential transmission between curves 704 and 706 of the exemplary modulator, and curve 710 shows the average transmission of curves 704 and 706.

FIG. 7A shows the above curves in a state in which the exemplary modulator has suffered from temperature drift changing the resonant frequency of the modulator. As shown in FIG. 7A, the transmission of the exemplary resonator at the frequency of the exemplary carrier signal is high, as indicated by the intersection of line 702 and curve 704, resulting in little attenuation and ineffective modulation by the resonant modulator as indicated by the low value of the differential transmission, shown where curve 708 intersects at line 702. In FIGS. 7B and 7C, the temperature of the modulator has begun to be tuned by the processes set forth above. As part of this tuning, the average transmission curve 710 has begun to shift back toward the frequency of the exemplary carrier signal 702 and the differential transmission (shown by curve 708) has risen. In FIG. 7D, the temperature of the modulator has been stabilized in a range at which a desired attenuation of the exemplary carrier signal is achieved (as shown by the intersection of curve 710 with line 702). Additionally, in FIG. 7D, the differential transmission curve 708 is nearly maximized, showing that only the exemplary carrier signal (and not other optical carrier signals) are being modulated by the exemplary resonant modulator.

Although the invention is illustrated and described herein with reference to specific embodiments, the invention is not intended to be limited to the details shown. Rather, various modifications may be made in the details within the scope and range of equivalents of the claims and without departing from the invention.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for operating a resonant modulator having a tunable resonance, comprising the steps of:
   receiving a stream of data encoded to have an approximately equal number of high and low bits;
   in the resonant modulator, modulating a carrier signal having a carrier wavelength with the coded stream of data;
   transmitting the modulated carrier signal;
   from an extracted portion of the modulated carrier signal, determining an average power of the modulated carrier signal over a predetermined number of bits;
   comparing the average power to a predetermined threshold equal to an expected power value based on the assumption that half the number of data bits in the modulated carrier signal are high bits;
   incrementing a counter when the average power is greater than the predetermined threshold;
   decrementing the counter when the average power is not greater than the predetermined threshold; and operating a tuning device coupled to the resonant modulator based on a value of the counter;

wherein the average power is determined as a running average that varies over time;

wherein the comparing, the incrementing, the decrementing, and the operating of a tuning device are performed at repeated intervals without interrupting the receiving, the modulating, and the transmitting; and wherein the tuning device is operated so as to optimize a non-zero frequency offset between the tunable modulator resonance and the carrier wavelength at which equal numbers of high and low data bits are in the modulated carrier signal.

2. The method of claim 1, wherein when the count value is greater than another predetermined threshold, the tuning device is turned on, and when the count value is not greater than the other predetermined threshold, the tuning device is turned off.

3. The method of claim 1, wherein the determining step comprises:

integrating the extracted portion of the modulated carrier signal with an integrator.

4. The method of claim 3, wherein the counter is incremented or decremented once for every N bits of the data used to modulate the carrier signal, where N is a number from 10 to 500.

5. The method of claim 1, wherein the determining step comprises:

counting a number of high bits in the extracted modulated carrier signal with another counter to obtain a running count value as the average power of the modulated carrier signal.

6. The method of claim 5, wherein the counter is incremented or decremented once for every N bits of the data used to modulate the carrier signal, where N is a number from 10 to 500.

7. The method of claim 1, wherein the tuning device is a heater configured to adjust a temperature of the resonant modulator.

8. A system comprising:

an encoder configured to produce a stream of encoded data having an approximately equal number of high and low bits;

a resonant modulator having a tunable resonance and configured to receive the encoded data stream from the encoder, to modulate the encoded data stream onto a carrier signal having a carrier wavelength, thereby providing a modulated carrier signal, and to transmit the modulated carrier signal;

an input structure configured to receive, from the resonant modulator, a portion of the modulated carrier signal;

a plurality of processing elements configured to determine a time-varying running average power of the modulated carrier signal over a predetermined number of bits of the stream of data; and a digital control element configured to operate, at repeated intervals, a tuning device coupled to the resonant modulator based on the average power of the modulated carrier signal over the predetermined number of bits without interrupting the transmission of the modulated carrier signal by the resonant modulator; wherein:

the resonant modulator is configured to modulate the carrier signal at a non-zero frequency offset between the tunable modulator resonance and the carrier wavelength;

the digital control element is configured to urge the resonant modulator toward an optimal frequency offset at which equal numbers of high and low data bits are in the modulated carrier signal;

the plurality of processing elements includes an integrator and a counter;

the integrator is configured to integrate the modulated carrier signal to obtain a running average power value; and the counter is configured to increment or decrement a count based on comparing the running average power value to a predetermined threshold equal to an expected power value based on the assumption that half the number of data bits in the modulated carrier signal are high bits.

9. The system of claim 8, wherein the input structure comprises an evanescent coupling structure.

10. The system of claim 8, wherein the plurality of processing elements include:

a first counter configured to count a number of high bits of the data used to modulate the carrier signal to obtain a running count value; and a second counter configured to increment or decrement a count based on the running count value, wherein the count represents the average power of the modulated carrier signal.

11. The system of claim 8, wherein the digital control element comprises a digital to analog converter.

12. The system of claim 8, wherein the digital control element comprises a digital pulse-width modulator.

13. The system of claim 8, wherein the tuning device is a heater configured to adjust a temperature of the resonant modulator.

14. The system of claim 13, further comprising the heater.

* * * * *